United States Patent [19]

Craig

[11] 4,402,238
[45] Sep. 6, 1983

[54] DIFFERENTIAL CASE

[76] Inventor: Robert D. Craig, 350 North Rd., Butler, Pa. 16001

[21] Appl. No.: 163,733

[22] Filed: Jun. 27, 1980

[51] Int. Cl.³ .............................................. F16H 1/38
[52] U.S. Cl. ..................................... 74/710; 74/713; 74/607
[58] Field of Search ..................... 74/606 R, 607, 608, 74/609, 710, 713

[56] References Cited

U.S. PATENT DOCUMENTS

| | | | |
|---|---|---|---|
| 2,818,129 | 12/1957 | Harnett | 74/713 |
| 3,874,251 | 4/1975 | Lapitsky et al. | 74/713 |
| 3,955,443 | 5/1976 | Estrada | 74/607 |
| 4,037,492 | 7/1977 | Ashauer et al. | 74/713 |
| 4,183,263 | 1/1980 | Osenbaugh | 74/710 |

FOREIGN PATENT DOCUMENTS

| | | | |
|---|---|---|---|
| 2382627 | 11/1978 | France | 74/710 |
| 7308398 | 12/1974 | Netherlands | 74/606 R |

Primary Examiner—Kenneth Dorner
Attorney, Agent, or Firm—Buell, Blenko, Ziesenheim & Beck

[57] ABSTRACT

A differential case has a spider assembly within the case. The spider assembly has a plurality of shafts with each carrying a pinion. The end of each shaft is aligned with a port in the periphery of the case. A rigid retaining band is mounted to the case, and it surrounds the case and covers each of the ports. The band prevents a shaft in the spider assembly from leaving the case whenever the shaft breaks from the assembly.

1 Claim, 3 Drawing Figures

DIFFERENTIAL CASE

The invention relates to an improved differential case for a vehicle. The purpose of the improved case is to limit any failure of assemblage within the case to the internal portion of the case and prevent it from causing failure to other parts of the differential which are external to the case.

PROBLEM PRESENTED TO THE INVENTOR

Many vehicle differentials have a case formed by two halves known as a left half and a right half. The periphery of the case has socket ports at a parting plane of the joined halves. A spider assembly with one or more shafts is mounted within the case. Each shaft rests within one of the socket ports, and the shaft carries a side pinion which meshes with a side gear within the differential case. External to the differential case is a drive pinion which meshes with a ring gear. The shaft for the drive pinion is supported by a pinion bearing which is supported by a pinion bearing support.

Very frequently the spider assembly will fail. The spider assembly shaft will fracture because of shock or fatigue due to spinning of the vehicle wheels. This is known as initial failure of the differential. When the spider shaft breaks or separates from the spider assembly the spider shaft will leave the differential case through the socket port due to centrifugal forces. The piece of the shaft after it leaves the differential case will destroy the pinion bearing support, the drive pinion and the ring gear. This has the effect of completely destroying the entire differential. The inventor has sought to solve the problem of containing the initial failure and preventing the initial failure from destroying the entire differential assembly. The cost factors in saving the remaining differential assemblage from damage caused by the initial failure are great. If it were possible to prevent additional failure after the initial failure of the spider assembly the cost of repairing the differential would be limited to replacement of the spider assembly and the side pinion or pinions affected.

PRIOR ART

There is no art presently known to the inventor which is designed to contain or limit initial failure of a differential and prevent that initial failure from affecting other parts of the differential.

There is a structure shown in U.S. Pat. No. 3,874,251 issued Apr. 1, 1975 to Lapitsky et al. for a Bevel Gear Differential which uses a "movable" and "flexible" ring member surrounding the differential casing. The ring member is movable in a plane normal to the rotational axes of the differential casing. Also from what is shown in the drawings there would appear to be some movement along the rotational axis of the casing between the "stops 16" on the casing designed "to limit the shift of the ring with respect to the casing". The purpose of the ring is to insure counter-balancing of the thrust acting upon the "satellites" (pinion) and provide a more uniform distribution of pressures acting upon the teeth of the pinions. The movement of the ring in a plane normal to the rotational axis of the casing insures the counter-balancing of the thrust.

This patent is not directed to the problem which the inventor of the improved casing has addressed his design. The ring shown in the above patent is constantly flexing and is being deformed (FIG. 13) due to the constant forces acting upon it. Under these circumstances the band becomes a wearing part and becomes a source of potential initial failure. When the ring fails the inserts 17 will eject under centrifugal forces and cause the very additional failure that the inventor of the improved casing is seeking to avoid.

THE INVENTOR'S SOLUTION TO THE PROBLEM

The inventor designed a differential case which will prevent additional failure from occurring after there is an initial failure of the spider assembly inside the differential case. The design includes a rigid band surrounding the case and covering each port in the periphery of the case. The band is rigidly mounted to the case so as to maintain the band in a fixed relationship with respect to the differential case. The band will prevent a spider assembly shaft, which breaks from the spider assembly, from being thrown by centrifugal force outside of the case from the port in the case periphery. This will prevent additional damage to the pinion bearing support, the drive pinion and the ring gear. The band is not flexible and is bolted to the casing thereby keeping the band in a fixed relation with respect to the casing. The band has no wearing parts and always runs concentric with respect to the case. There is no load on the band until a shaft in the spider assembly breaks. The reason for this is that in the type of differential in which the inventor uses the band, the spider assembly's shafts do not float or move radially outward.

The inventor provides a differential case formed by a left half and a right half, and ports in the periphery. A spider assembly is mounted within the case, the spider assembly has a plurality of shafts each carrying a pinion, each shaft having an outer end aligned with a port, the improvement comprising a rigid retaining band surrounding the case and covering each of the ports and rigidly mounted to the case so as to maintain the band in a fixed relationship with respect to the case.

The inventor further provides that the band has a plurality of bolt lugs along one edge of the band and extending radially inwardly with bolts passing through each bolt lug to the case thereby joining the band to the case and maintaining the band in a fixed relationship with respect to the case.

A DESCRIPTION OF THE STRUCTURE

Figure 1:
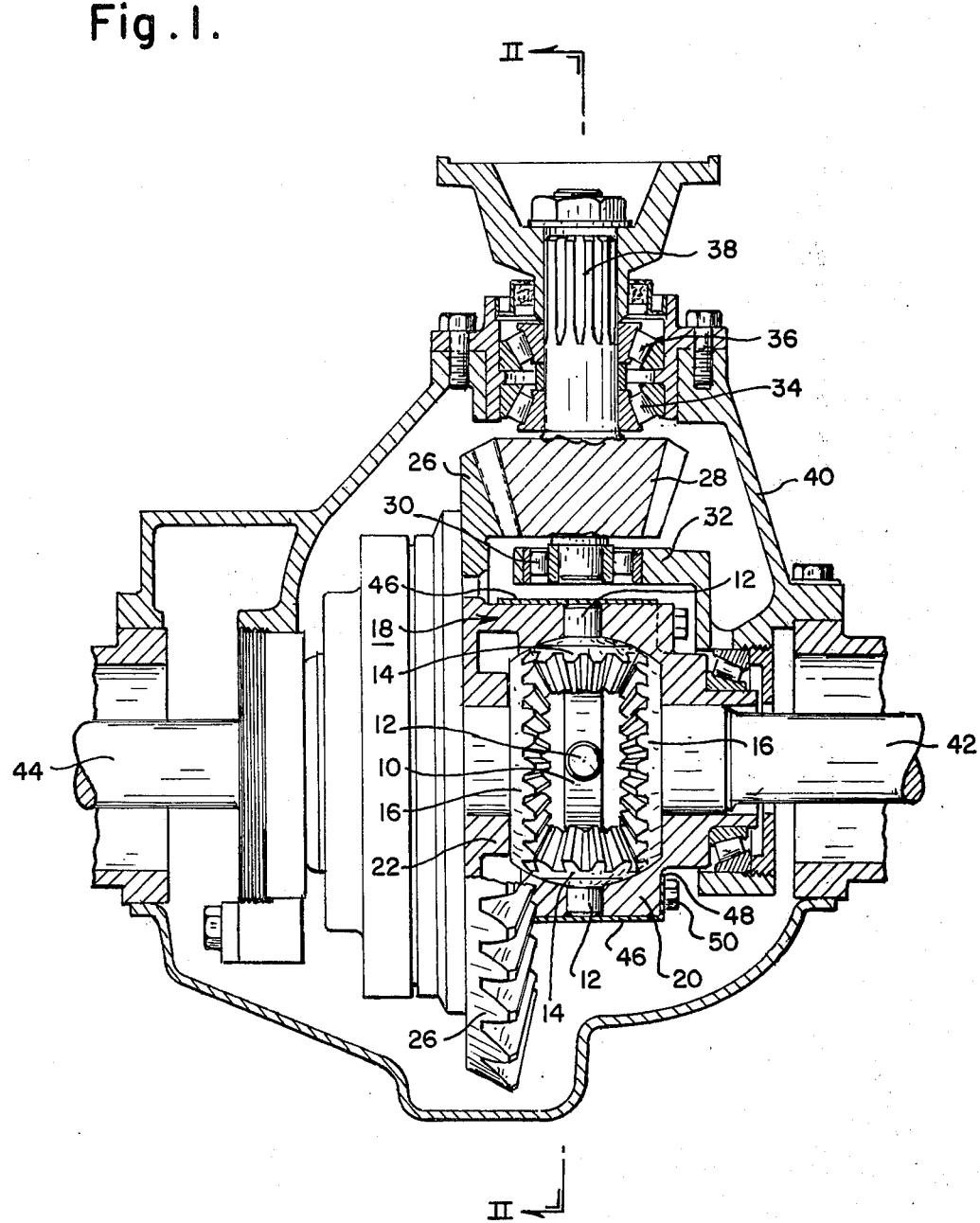
FIG. 1 is a fragmentary, elevational and partial sectional view through a differential housing.
Figure 2:
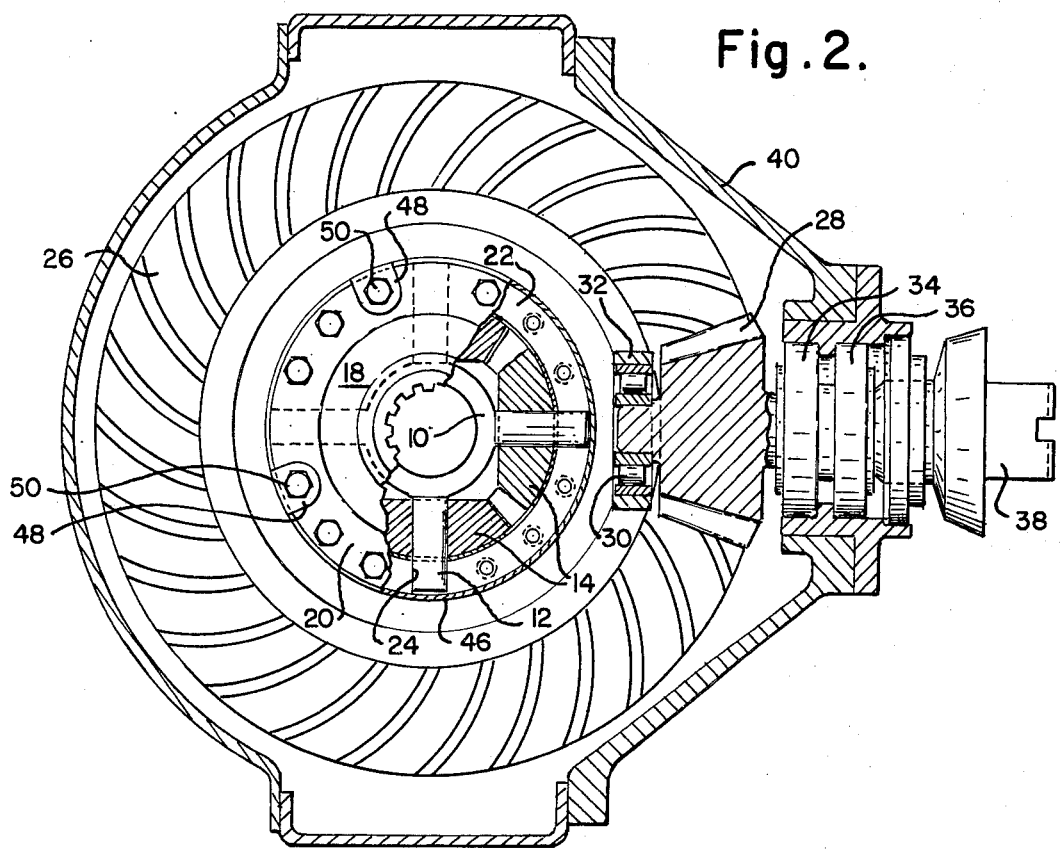
FIG. 2 is a fragmentary, elevational and partial sectional view taken generally on the plane II—II shown in FIG. 1.
Figure 3:
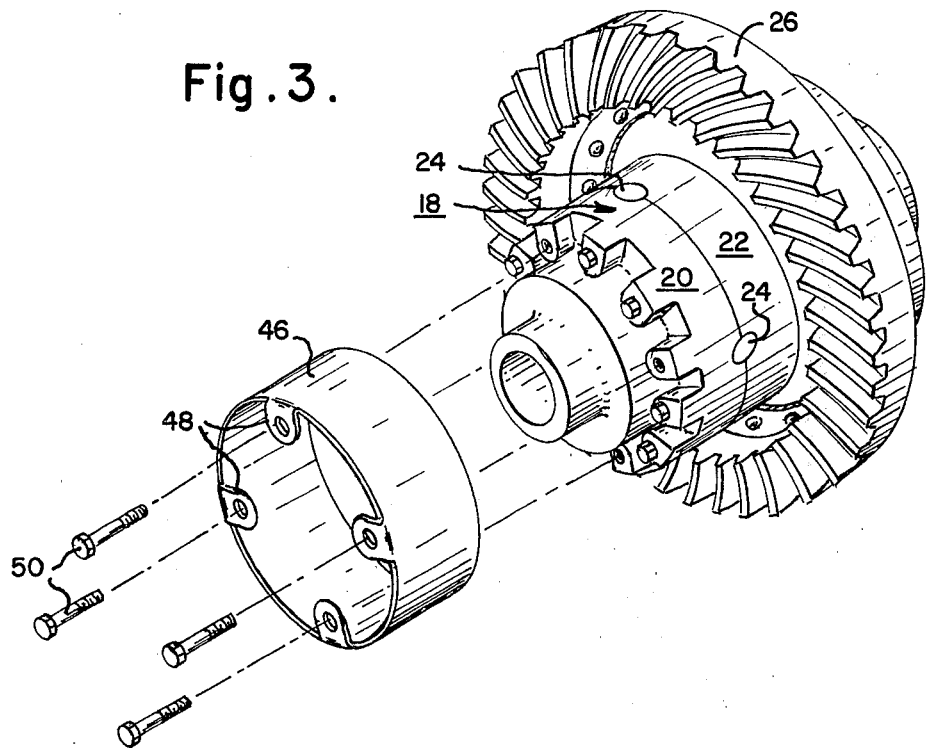
FIG. 3 is an isometric view of a ring gear and differential case showing a retaining band separated from the differential casing.

The figures show a spider assembly 10 having four spider assembly shafts 12. Each shaft 12 carries a side pinion 14 which meshes with side gears 16. The spider assembly 10 with the side pinions 14 and side gears 16 are housed within a differential casing generally shown as 18 which is formed by a differential case right half 20 and a differential case left half 22 which are bolted together. The shafts 12 rest within the socket ports 24 which are formed at the parting plane of the two halves 20,22 and in the periphery of the differential casing 18. A ring gear 26 mounted on the differential case left half 22 meshes with drive pinion 28 supported by pinion bearing 30 which is supported by pinion bearing support 32. The drive pinion 28 is also supported by bearings 34 and 36. Shaft 38 is coupled to the drive shaft not shown. A differential carrier housing 40 supports and surrounds the above assembly. Axles 42 and 44 are shown with respect to the differential carrier housing 40.

Due to fatigue or shock one of the spider assembly shafts 12 may break. If this occurs the shaft will be thrown from the socket port 24 which supports the shaft and will destroy the pinion bearing support 32, the bearing 30 and the drive pinion 28 and ring gear 26. To contain the broken shaft 12 within the differential casing 18 a rigid retaining band 46 surrounds the case 18 covering each of the socket ports 24. The band 46 has a plurality of bolt lugs 48 along one edge of the band 46 and they extend radially inwardly to receive bolts 50 which rigidly join the band 46 to the differential case 18. This maintains the band in a fixed relationship with respect to the case 18. Whenever a shaft 12 breaks it is prevented from leaving the case 18 by the retaining band 46 and further failure of other parts of the differential is prevented. The band 46 does not have any wearing areas and therefore is not a source of potential failure itself. The only time forces act upon the band 46 is when there is an initial failure in the spider assembly.

It is to be understood that the improvement can be used with a differential case which has only one shaft mounted within the case carrying the side pinions and one corresponding port in the periphery instead of the spider assembly having a plurality of shafts.

I claim:

1. A differential case having at least one port in the periphery of the case and an assembly within the case which has at least one shaft carrying at least one pinion and the shaft having an outer end aligned with the port, the improvement comprising a rigid retaining band surrounding the case and covering the port, the band having a plurality of bolt lugs along one edge of the band and extending radially inwardly to receive a bolt which passes through each bolt lug and joins the band to the case so as to maintain the band in a fixed relationship with respect to the case thereby preventing the shaft from being ejected from the case when the shaft breaks.

* * * * *